US009900866B2

(12) United States Patent
Viswanath

(10) Patent No.: US 9,900,866 B2
(45) Date of Patent: *Feb. 20, 2018

(54) PEER-TO-PEER DEVICE IDENTIFICATION AND COGNITIVE COMMUNICATION

(71) Applicant: QUALCOMM Incorporated, San Diego, CA (US)

(72) Inventor: Pramod Viswanath, Champaign, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,378

(22) Filed: Feb. 23, 2015

(65) Prior Publication Data

US 2015/0173058 A1 Jun. 18, 2015

Related U.S. Application Data

(63) Continuation of application No. 12/479,466, filed on Jun. 5, 2009, now Pat. No. 8,964,653.
(Continued)

(51) Int. Cl.
  *H04W 4/00* (2009.01)
  *H04W 72/04* (2009.01)
  (Continued)

(52) U.S. Cl.
  CPC ..... *H04W 72/0406* (2013.01); *H04W 72/042* (2013.01); *H04W 72/0413* (2013.01);
  (Continued)

(58) Field of Classification Search
  None
  See application file for complete search history.

(56) References Cited

U.S. PATENT DOCUMENTS 7,660,315 B2 2/2010 Kodialam et al.
8,964,653 B2 * 2/2015 Viswanath .......... H04W 72/042
370/329
(Continued)

FOREIGN PATENT DOCUMENTS

EP 1231745 A2 8/2002
JP 2008048286 A 2/2008
(Continued)

OTHER PUBLICATIONS

Devroye N., et al., "Achievable Rates in Cognitive Radio Channels", IEEE Transactions on Information Theory, vol. 52, No. 5, May 2006, pp. 1813-1827.
(Continued)

*Primary Examiner* — Anh-Vu Ly
(74) *Attorney, Agent, or Firm* — Arent Fox, LLP

(57) ABSTRACT

Systems and methodologies are described that facilitate identifying devices in a wireless network and cognitively communicating with devices over utilized frequencies. Devices can be identified by receiving downlink resource assignments related to the devices, evaluating uplink transmissions thereover, and identifying the devices from one or more aspects of the uplink transmissions (e.g., an identifier in the transmission). Moreover, the uplink transmissions can be re-transmitted to a serving device to provide relay functionality for the transmissions. Additionally, peer-to-peer communication with the device and/or other devices can be facilitated by using a portion of available transmission power to re-transmit while using the other portion to transmit peer-to-peer communications. Thus, interference caused by the peer-to-peer communications is mitigated by additionally functioning as a relay using a portion of the transmit power.

43 Claims, 10 Drawing Sheets

Related U.S. Application Data

(60) Provisional application No. 61/080,071, filed on Jul. 11, 2008.

(51) Int. Cl.
*H04W 16/14* (2009.01)
*H04L 1/18* (2006.01)
*H04W 88/04* (2009.01)

(52) U.S. Cl.
CPC ........... *H04L 1/1867* (2013.01); *H04W 16/14* (2013.01); *H04W 72/0473* (2013.01); *H04W 88/04* (2013.01)

(56) References Cited

U.S. PATENT DOCUMENTS

| | | | |
|---|---|---|---|
| 2002/0154688 A1* | 10/2002 | Pollmann | H04L 1/0003 375/229 |
| 2004/0235489 A1 | 11/2004 | Kwon | |
| 2005/0059420 A1* | 3/2005 | Salokannel | H04L 45/00 455/522 |
| 2005/0226198 A1* | 10/2005 | Barak | H04B 7/265 370/345 |
| 2005/0249185 A1 | 11/2005 | Poor et al. | |
| 2006/0182208 A1* | 8/2006 | Lee | H04B 7/02 375/347 |
| 2007/0076807 A1 | 4/2007 | Jin et al. | |
| 2007/0280172 A1* | 12/2007 | Tan | H04B 7/2606 370/335 |
| 2008/0069039 A1 | 3/2008 | Li et al. | |
| 2008/0069041 A1 | 3/2008 | Tandai et al. | |
| 2008/0160927 A1 | 7/2008 | Bar-Ness et al. | |
| 2008/0232315 A1 | 9/2008 | Bachl et al. | |
| 2008/0274692 A1 | 11/2008 | Larsson | |
| 2008/0279155 A1* | 11/2008 | Pratt, Jr. | H04L 12/66 370/336 |
| 2008/0279204 A1* | 11/2008 | Pratt, Jr. | G01D 21/00 370/406 |
| 2009/0010185 A1 | 1/2009 | Li et al. | |
| 2009/0022162 A1 | 1/2009 | Oksman | |
| 2009/0022163 A1 | 1/2009 | Oksman | |
| 2010/0008312 A1 | 1/2010 | Viswanath | |
| 2010/0150167 A1 | 6/2010 | Oksman | |
| 2012/0307765 A1 | 12/2012 | Chakrabarti et al. | |

FOREIGN PATENT DOCUMENTS

| | | | |
|---|---|---|---|
| JP | 2008078807 A | 4/2008 | |
| JP | 2008118499 A | 5/2008 | |
| JP | 2008252513 A | 10/2008 | |
| JP | 2009267995 A | 11/2009 | |
| JP | 2011508463 A | 3/2011 | |
| KR | 20080029421 A | 4/2008 | |
| RU | 2282943 C2 | 8/2006 | |
| WO | 2007064249 A1 | 6/2007 | |
| WO | 2007093653 A1 | 8/2007 | |
| WO | 2008038895 A2 | 4/2008 | |
| WO | 2008047456 A1 | 4/2008 | |
| WO | 2008055251 A2 | 5/2008 | |
| WO | 2008072082 A2 | 6/2008 | |

OTHER PUBLICATIONS

European Search Report—EP11165398, Search Authority—Munich Patent Office, Apr. 8, 2011.
International Search Report & Written Opinion—PCT/US2009/049311, International Search Authority—European Patent Office—Jan. 19, 2010.
Jovicic A., et al., "Cognitive Radio: An Information-Theoretic Perspective," submitted to IEEE Trans. Information Theory, arXiv:cs.IT/0604107, vol. 55, No. 9, Sep. 9, 2009, pp. 3945-3958.
Kennedy R. S., "Fading Dispersive Communication Channels", Wiley-Interscience a division of John Wiley & Sons, New York, 1969, Chapters 5 and 7, 6 pages.
Taiwan Search Report—TW098122109—TIPO—Nov. 2, 2012.
Tse D. et al., "Fundamentals of Wireless Communication", Cambridge University Press, chapters 6 and 10, 2005, 10 pages.
Verdu S., "Spectral Efficiency in the Wideband Regime," (Invited Paper) IEEE Trans. Information Theory, vol. 48, No. 6, pp. 1319-1343, Jun. 2002.
Taiwan Search Report—TW102126483—TIPO—Mar. 19, 2015.
Taiwan Search Report—TW102126483—TIPO—Mar. 30, 2016.

* cited by examiner

PEER-TO-PEER DEVICE IDENTIFICATION AND COGNITIVE COMMUNICATION

CLAIM OF PRIORITY UNDER 35 U.S.C. §119

The present application for patent is a continuation of Non-Provisional application Ser. No. 12/479,466, filed Jun. 5, 2009, which claims priority to Provisional Application No. 61/080,071 entitled "COGNITIVE PEER-TO-PEER COMMUNICATION" filed Jul. 11, 2008, and assigned to the assignee hereof. This application incorporates by reference the entireties of those applications.

BACKGROUND

Field

The following description relates generally to wireless communications, and more particularly to identifying and peer-to-peer communicating with devices.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Peer-to-peer communication has multiple implementations. For example, in a cellular network, resources can be reserved in the cellular network frequency spectrum to facilitate direct peer-to-peer communications. In addition, cognitive radios have been developed where peer-to-peer (or other) devices can communicate over frequency spectrums traditionally reserved for a given technology by becoming secondary users of the spectrums. For example, since frequency modulation (FM) radio in a given area does not typically utilize the entire spectrum reserved for FM radio, cognitive radios can communicate over the unutilized resources in that area. In this regard, cognitive radios should not interfere with communication between primary users of the spectrum, and thus can determine resources in use by primary users before attempting to communicate with other cognitive radios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating identifying neighboring peer-to-peer communication devices and opportunistically communicating with the devices. In particular, a cognitive peer-to-peer device can listen to downlink assignments from an access point or other wireless network entity and identify other active devices based at least in part on correlating the downlink assignments with uplink transmissions from the active devices to the access point or other wireless network entity. In addition, the cognitive peer-to-peer device can communicate directly with the identified devices over the cellular frequency spectrum by utilizing a portion of transmission power to communicate with the identified devices while using a remaining portion of the transmission power to re-transmit the decoded uplink transmissions (e.g., used to previously identify the devices or other received uplink transmissions) to the access point. In this regard, the cognitive peer-to-peer device can additionally act as a relay in re-transmission periods while peer-to-peer communicating with other neighboring devices.

According to related aspects, a method is provided that includes receiving a downlink assignment from a serving device in a wireless network and obtaining an uplink transmission sent from a served device in the wireless network over resources specified in the downlink assignment. The method further includes identifying the served device based at least in part on one or more aspects of the uplink transmission.

Another aspect relates to a wireless communications apparatus. The wireless communications apparatus can include at least one processor configured to obtain a resource assignment transmitted by an access point for a mobile device and receive an uplink transmission from the mobile device to the access point over a portion of resources in the resource assignment. The at least one processor is further configured to identify the mobile device based at least in part on one or more aspects of the uplink transmission. The wireless communications apparatus also comprises a memory coupled to the at least one processor.

Yet another aspect relates to an apparatus that includes means for receiving a downlink assignment from a serving device in a wireless network and means for receiving an uplink transmission related to the downlink assignment sent from a served device in the wireless network. The apparatus further includes means for identifying the served device based at least in part on the uplink transmission.

Still another aspect relates to a computer program product, which can have a computer-readable medium including code for causing at least one computer to receive a downlink assignment from a serving device in a wireless network. The computer-readable medium can also comprise code for causing the at least one computer to obtain an uplink transmission sent from a served device in the wireless network over resources specified in the downlink assignment. Moreover, the computer-readable medium can comprise code for causing the at least one computer to identify the served device based at least in part on one or more aspects of the uplink transmission.

Moreover, an additional aspect relates to an apparatus. The apparatus can include a downlink assignment detection component that receives a downlink assignment from a serving device in a wireless network and an uplink transmission analysis component that receives an uplink transmission related to the downlink assignment sent from a served device in the wireless network. The apparatus further includes a device identification component that identifies the served device based at least in part on the uplink transmission.

According to other aspects, a method is provided that includes receiving a transmission from a wireless device communicating in a wireless network. The method further includes re-transmitting the transmission to a related access point in a time slot using a portion of an available transmission power and communicating with a peer-to-peer device in the time slot using a remaining portion of the available transmission power.

Another aspect relates to a wireless communications apparatus. The wireless communications apparatus can include at least one processor configured to obtain an uplink transmission from a mobile device and re-transmit the uplink transmission to a related access point using a portion of available transmission power. The at least one processor is further configured to transmit data to a peer-to-peer device using a remaining portion of the available transmission power. The wireless communications apparatus also comprises a memory coupled to the at least one processor.

Yet another aspect relates to an apparatus that includes means for receiving a transmission from a wireless device communicating in a wireless network and means for re-transmitting the transmission to a related serving device in a time slot using a portion of an available transmission power. The apparatus further includes means for communicating with a peer-to-peer device in the time slot using a remaining portion of the available transmission power.

Still another aspect relates to a computer program product, which can have a computer-readable medium including code for causing at least one computer to receive a transmission from a wireless device communicating in a wireless network. The computer-readable medium can also comprise code for causing the at least one computer to re-transmit the transmission to a related access point in a time slot using a portion of an available transmission power. Moreover, the computer-readable medium can comprise code for causing the at least one computer to communicate with a peer-to-peer device in the time slot using a remaining portion of the available transmission power.

Moreover, an additional aspect relates to an apparatus. The apparatus can include an uplink transmission analysis component that receives a transmission from a wireless device communicating in a wireless network and a device re-transmission component that re-transmits the transmission to a related serving device in a time slot using a portion of an available transmission power. The apparatus further includes a peer-to-peer communication component that transmits data to a peer-to-peer device in the time slot using a remaining portion of the available transmission power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
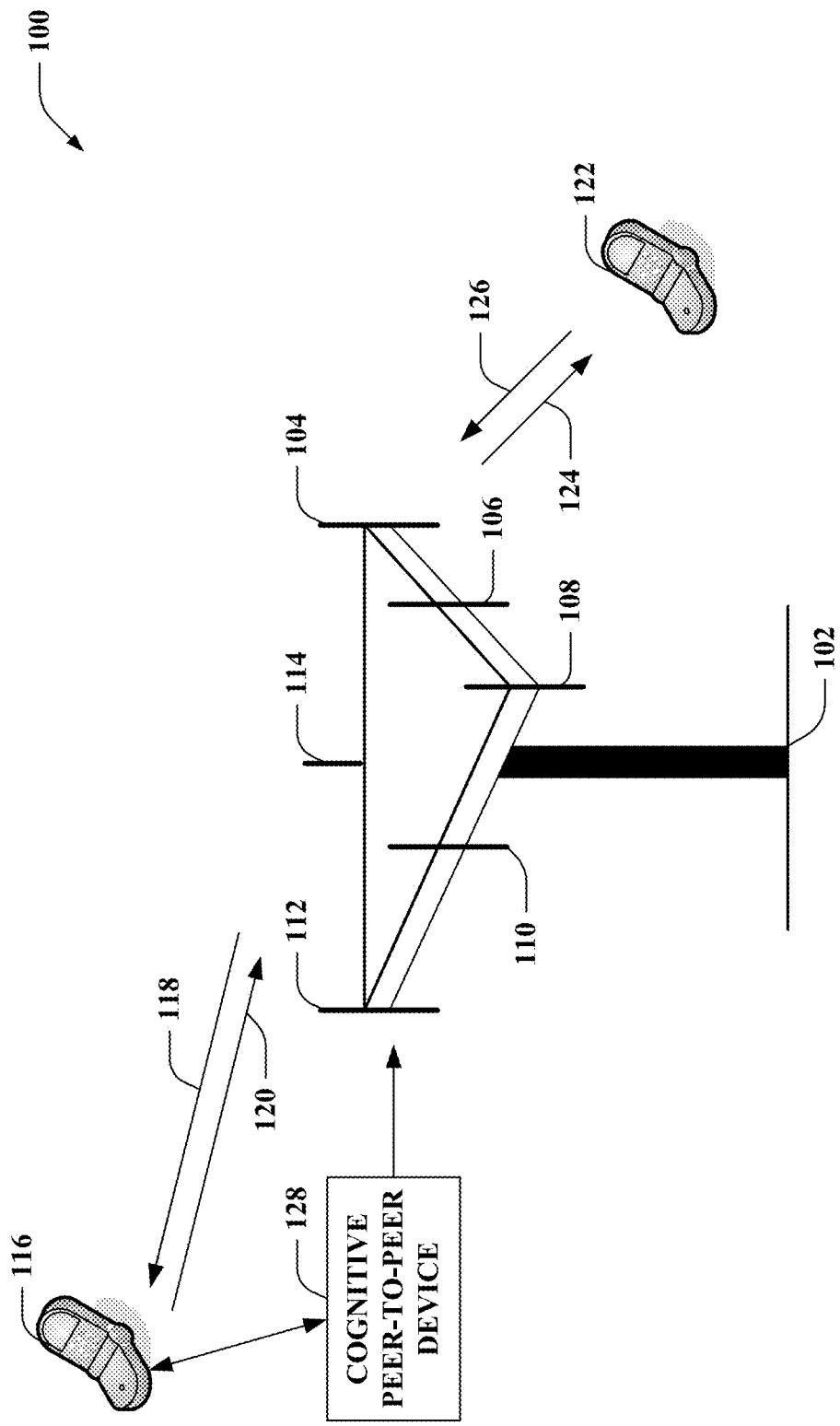
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology. In addition, a wireless communications apparatus can refer to a terminal, access point, or substantially any device that communicates in a wireless network.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the mobile devices 116 and 122 over the channels, which can be created for various types of data. For example, channels can be created for communicating various types of general communication data, control data (e.g., quality information for other channels, acknowledgement indicators for data received over channels, interference information, reference signals, etc.), and/or the like.

In an example, a cognitive peer-to-peer device 128 is also provided. The cognitive peer-to-peer device 128 can be another mobile device, access point, other device, etc., that communicates with the mobile device 116 and/or other devices (not shown). In one example, the cognitive peer-to-peer device 128 can be an independently powered device in a home or business, for example, that provides communication services in conjunction with or as an alternative to base station 102. In addition, the cognitive peer-to-peer device 128 can identify neighboring devices. In an example, the cognitive peer-to-peer device 128 can receive or otherwise listen to downlink assignments from the base station 102 to the mobile devices 116 and 122. The cognitive peer-to-peer device 128 can also receive or otherwise listen to uplink transmissions from the mobile devices 116 and 122 over resources in the downlink assignments to identify the mobile devices 116 and 122 (e.g., based on information within the uplink transmissions). This can be done for an initial transmission by the mobile device 116, for example, even though the base station 102 may require re-transmission since the cognitive peer-to-peer device 128 may be geographically nearer to the mobile device 116 (e.g., the mobile device 116 has improved signal-to-noise ratio (SNR) at the cognitive peer-to-peer device 128).

According to another example, the mobile device 116 can communicate with the base station 102 using a re-transmission scheme (such as hybrid automatic repeat/request (H-ARQ) and/or the like). In this example, the cognitive peer-to-peer device 128 can receive an uplink transmission from the mobile device 116 to the base station 102, as described, to identify the mobile device 116 and/or receive a subsequent transmission. Where re-transmission is required (e.g., the base station 102 indicates that it did not properly receive the transmission), the mobile device 116 can re-transmit to the base station 102. In addition, the cognitive peer-to-peer device 128 can also re-transmit on behalf of the mobile device 116 acting as a relay amplifying the signal from the mobile device 116. In one example, the cognitive peer-to-peer device 128 can utilize a portion of available transmission power to re-transmit to the base station. In this example, the cognitive peer-to-peer device 128 can also utilize a remaining portion of the available transmission power to perform peer-to-peer communication with the mobile device 116 or another peer-to-peer device (not shown). Thus, the peer-to-peer communication from the cognitive peer-to-peer device 128 can interfere with base station 102/mobile device 116 communication, but the cognitive peer-to-peer device 128 can mitigate the interference by additionally boosting the mobile device 116 re-transmission signal to the base station 102, as described.

In addition, though not shown, the cognitive peer-to-peer device 128 can provide similar functionality for downlink transmissions/re-transmissions from the base station 102. Moreover, the cognitive peer-to-peer device 128 can be employed for existing peer-to-peer communication providing similar functionality; indeed, the cognitive peer-to-peer device 128 can identify devices and provide cognitive transmission during re-transmission in substantially any wireless network configuration. Once devices are identified, the cognitive peer-to-peer device 128 can provide the identity to an interface or a disparate network component, in one example.

Figure 2:
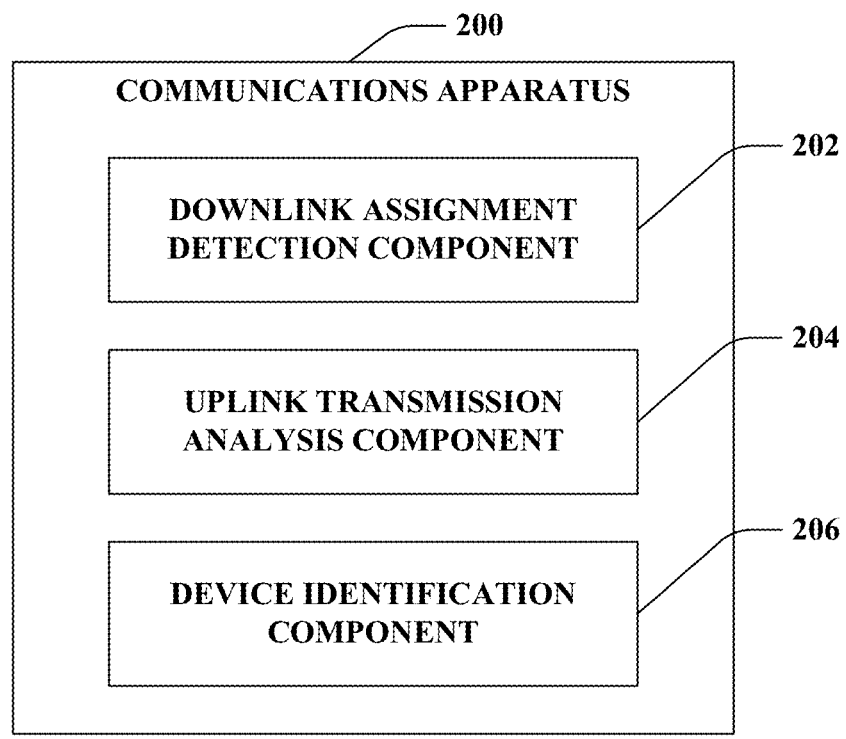
FIG. 2 is an illustration of an example communications apparatus for employment within a wireless communications environment.

Turning to FIG. 2, illustrated is a communications apparatus 200 for employment within a wireless communications environment. The communications apparatus 200 can be a mobile device, access point, a portion thereof, a cognitive radio that can be present in the mobile device, access point, etc., or substantially any communications apparatus in a wireless network. The communications apparatus 200 includes a downlink assignment detection component 202 that can receive downlink assignments, which can be transmitted between an access point (not shown) and mobile device (not shown) or substantially any communicating devices, an uplink transmission analysis component 204 that can obtain and evaluate uplink transmissions over resources in the downlink assignments, and a device identification component 206 that can determine a device identity based at least in part on the uplink transmissions.

According to an example, the downlink assignment detection component 202 can monitor a frequency band utilized by one or more primary users, such as a cellular network band. The downlink assignment detection component 202 can receive, for example, a downlink assignment over the band, which can be transmitted by one device (e.g., a serving device) to grant resources to another device (e.g., a served device). The downlink assignment detection component 202 can decode the downlink assignment to determine the granted resources. Subsequently, uplink transmission analysis component 204 can receive uplink transmissions over the resources granted in the downlink assignment and evaluate the uplink transmissions to determine information about the device. In addition, the device identification component 206 can discern an identity of the device based on an identifier in one or more of the uplink transmissions.

In another example, the device identification component 206 can identify the device based on one or more aspects of the uplink transmissions, such as a hopping pattern, scrambling code, and/or the like. In any case, once the device is identified, the communications apparatus 200 can perform other functions based on the identity of the device, such as associate a location of the device with the device identifier, communicate with the device, act as a relay in re-transmitting one or more of the uplink transmissions on behalf of and/or in conjunction with the device, etc. In one example, the device identification component 206 can send the device identity to an interface or other network component (e.g., a disparate communications apparatus, an upstream component, a mobile device, an access point, etc.).

Figure 3:
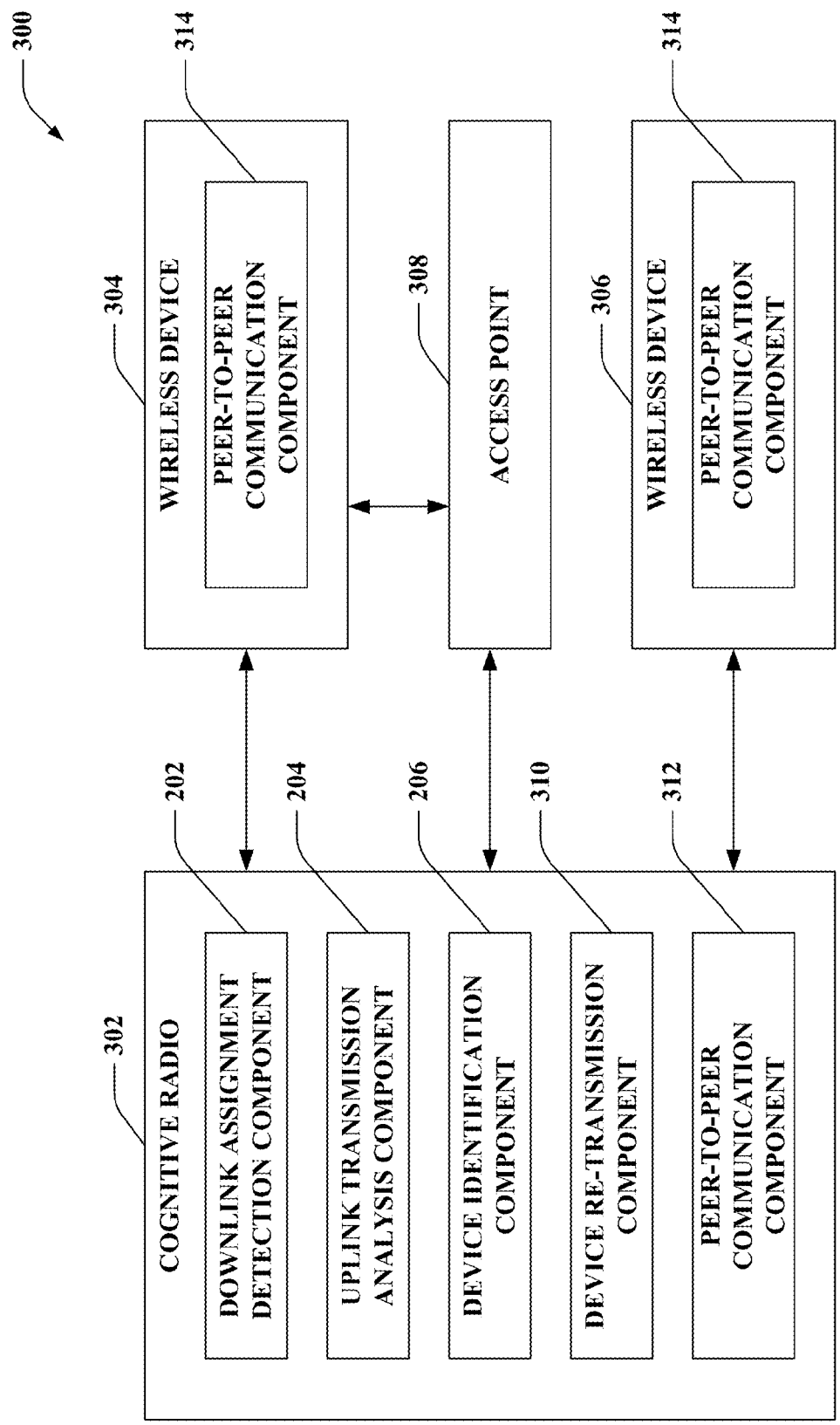
FIG. 3 is an illustration of an example wireless communications system that effectuates identifying network devices and cognitive peer-to-peer communication.

Now referring to FIG. 3, illustrated is a wireless communications system 300 that facilitates identifying devices in a wireless network and peer-to-peer communicating with the identified devices. Cognitive radio 302 can be an independent device in a wireless network (e.g., a powered terminal at a home or office), present within a mobile device, access point, and/or the like, etc. Wireless devices 304 and 306 can be mobile devices (including not only independently powered devices, but also modems, for example), base stations, and/or portions thereof, or substantially any wireless device.

Access point 308 can be a base station, femtocell access point, picocell access point, relay node, and/or the like. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communication between the cognitive radio 302, wireless devices 304 and 306, and/or the access point 308.

Cognitive radio 302 can include a downlink assignment detection component that receives one or more downlink assignments related to a device, an uplink transmission analysis component 204 that listens for and receives transmissions from devices over resources related to the downlink assignments, a device identification component 206 that can identify devices based at least in part on the uplink transmissions, a device re-transmission component that re-transmits the uplink transmission to a serving device to provide relay functionality, and a peer-to-peer communication component that transmits data to and receives data from one or more additional devices. In addition, wireless devices 304 and 306 can include peer-to-peer communication components 314 that can transmit and receive to/from other peer-to-peer devices, such as each other and/or cognitive radio 302.

According to an example, the wireless device 304 can communicate with access point 308 to receive access to a wireless network. In this regard, the access point 308 can assign resources to the wireless device 304 over which communications can be received from and transmitted to the wireless device 304. The downlink assignment detection component 202 can receive resource assignments transmitted to the wireless device 304 by the access point 308 to detect when uplink transmissions are to occur. Subsequently, as described, the uplink transmission analysis component 204 can obtain and decode transmissions from the wireless device 304 to the access point 308 over the assigned resources. The device identification component 206 can determine a parameter identifying the wireless device 304 based at least in part on one or more aspects of the uplink transmissions, such as an identifier stored in the transmission, a hopping or scrambling pattern, and/or the like.

Additionally, the cognitive radio 302 can utilize the device identity (and the uplink transmission) to perform peer-to-peer communication with the device. For example, the device re-transmission component 310 can utilize partial transmission power at the cognitive radio 302 to re-transmit the uplink transmission to the access point 308, along with the wireless device 304, where the access point 308 non-acknowledges receipt of the transmission. With the remaining transmission power, the peer-to-peer communication component 312 can transmit peer-to-peer communications to the wireless device 304 and/or wireless device 306. The peer-to-peer communication component 314 at the wireless device 304 and/or wireless device 306 can receive the peer-to-peer communication. It is to be appreciated that the device re-transmission component 310 can determine to re-transmit the uplink transmission in a re-transmission time slot based on the uplink transmission component 204 or other component additionally receiving a re-transmission request or notification from the access point 308 (e.g., such as an ARQ non-acknowledgement received over a control channel between the access point 308 and wireless device 304).

In addition, the peer-to-peer communication component 314 of the wireless device 304 and/or wireless device 306 can transmit peer-to-peer data to the cognitive radio 302 in a similar regard, for example, such that it can transmit at partial power along with a re-transmission to the access point 308, where it knows the device re-transmission component 310 will also be re-transmitting for the wireless device 304 and/or 306 to the access point 308. Moreover, in another example, the wireless device 304 and/or 306 can detect the cognitive radio 302 based on a transmitted identification signal. In this example, the wireless device 304 and/or 306 can indicate its presence to the cognitive radio 302, as well as its resource assignment(s) for instance. Similarly, the uplink transmission analysis component 204 can receive uplink transmissions, and the device re-transmission component 310 can act as a relay in re-transmitting the uplink transmissions while the peer-to-peer communication component 312 transmits and/or receives peer-to-peer communications to/from the wireless device 304 and/or 306, as described previously.

Also, in one example, if the cognitive radio 302 is close enough to the wireless device 304 and/or 306, the uplink transmission analysis component 204 can decode a message in the transmission before the transmission is complete. In this example, the device re-transmissions component 310 can additionally boost the original transmission by immediately transmitting the message to the access point 308 until the wireless device 304 completes its transmission. Additionally, it is to be appreciated that the wireless devices 304 and/or 306 can include components of the cognitive radio 302 to facilitate device detection and/or peer-to-peer transmission dividing with re-transmission of other signals, for example, as described above.

As described, the cognitive radio 302 can interfere with communication between the wireless devices 304 and/or 306 and access point 308, but it makes up for the interference by acting as a relay using a portion of the transmission power. In one example, the wireless device 304 and access point 308 can be primary communicators over the frequency spectrum. In this regard, the cognitive radio 302 and the wireless device 304 and/or 306 can be secondary for communicating over the frequency spectrum. The device re-transmission component 310 and peer-to-peer communication component 312 can utilize a linear superposition coding strategy to transmit the re-transmission using a portion of power and the peer-to-peer communication using the remaining portion, in one example.

Figure 4:
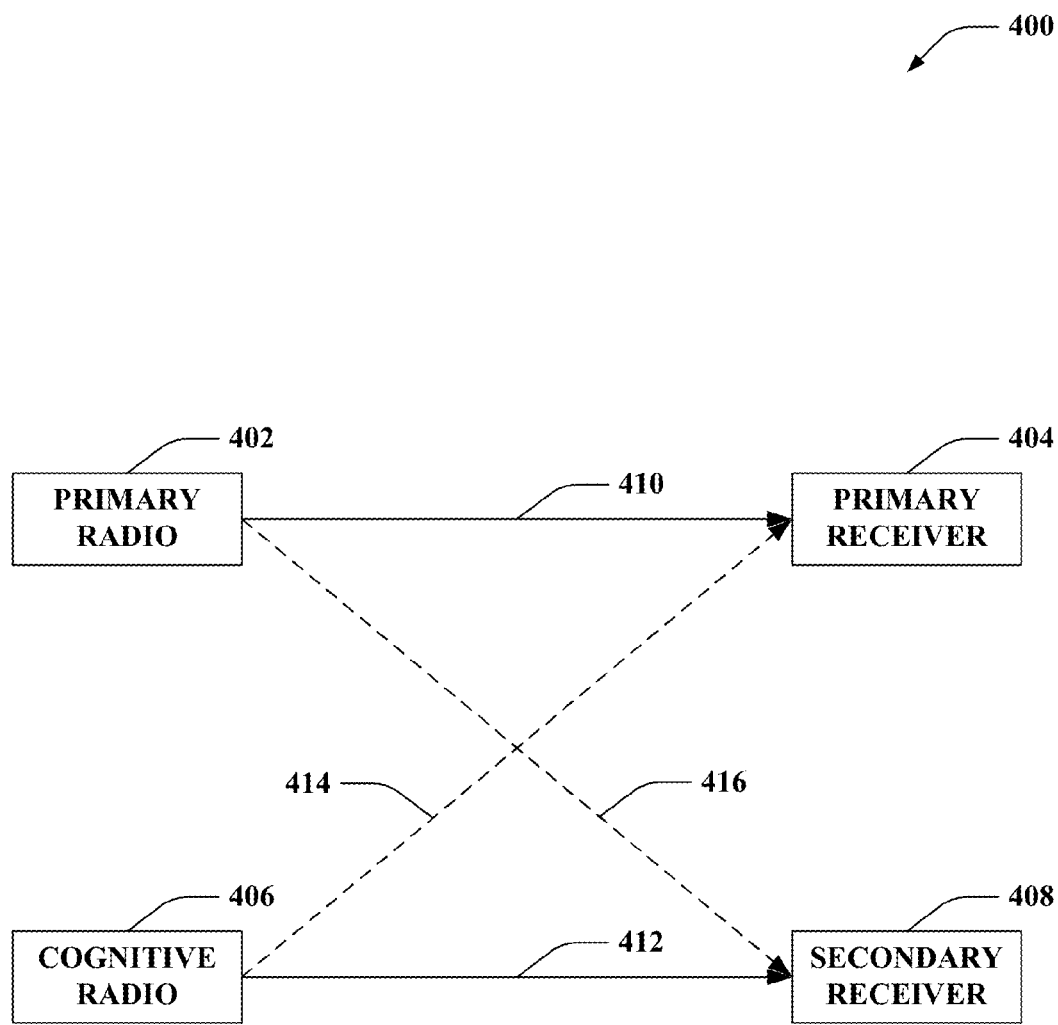
FIG. 4 is an illustration of an example system that facilitates cognitive peer-to-peer communication.

Turning to FIG. 4, an example system 400 is shown that facilitates cognitive peer-to-peer communication in a wireless network. A primary radio 402 is shown that communicates with a primary receiver 404, shown by signal 410. In addition, a cognitive radio 406 is provided that communicates with a secondary receiver 408, shown by signal 412. As described, cognitive radio 406 transmissions can interfere with transmissions received at the primary receiver 404 (e.g., transmissions from the primary radio 402), shown by interference 414. In addition, the secondary receiver 408 can experience interference from the primary radio 402, shown by interference 416. To mitigate this interference at 414 and/or 416, as described, the cognitive radio 406 can transmit to the secondary receiver 408 while relaying transmissions from the primary radio 402 to the primary receiver 404. To facilitate such relaying, as described, the cognitive radio 406 can identify the primary radio 402 by detecting downlink resource assignments from the primary receiver 404 and evaluating uplink transmissions sent by the primary radio 402 to the primary receiver 404 over the resource assignments. In addition, it is to be appreciated that the primary radio 402 and secondary receiver 408 can be the same device, as described.

According to an example, the power utilized to transmit peer-to-peer communications and/or to relay a signal from the primary radio 402 at the cognitive radio 406 can be calculated. There can be additive noise at the primary receiver 404 and the secondary receiver 408 caused by the multiple transmissions. For the primary receiver 404, this can be denoted as vector $\tilde{Z}_p{}^n := (\tilde{Z}_{p,1}, \tilde{Z}_{p,2}, \ldots, \tilde{Z}_{p,n})$ for n symbol times, where $\tilde{Z}_p$ indicates the additive noise level at the primary receiver 404. Similarly, additive noise at the secondary receiver 408 is indicated as vector $\tilde{Z}_s{}^n := (\tilde{Z}_{s,1}, \tilde{Z}_{s,2}, \ldots, \tilde{Z}_{s,n})$. The additive noise in both cases can be assumed independently and identically distributed across the n symbol times, in one example. In addition, the primary radio 402 can have a message $m_p \in \{0, 1, \ldots, 2^{nR_p}\}$ intended for the primary receiver 404 where $R_p$ is the rate at which the primary radio 402 is transmitting. The cognitive radio 406 can have a message $m_c \in \{0, 1, \ldots, 2^{nR_c}\}$ intended for the secondary receiver 408 (where $R_c$ is the rate at which the cognitive radio 406 is transmitting) as well as the message $m_p$, when acting also as a relay. The signals transmitted by the primary radio 402 and cognitive radio 406 can be respectively denoted as signal vectors $\tilde{X}_p{}^n$ and $\tilde{X}_c{}^n$.

The average power transmitted by the signals can be constrained as $\tilde{P}_p$ and $\tilde{P}_c$ respectively such that:

$$\|\tilde{X}_p{}^n\|^2 \leq n\tilde{P}_p, \|\tilde{X}_c{}^n\|^2 \leq n\tilde{P}_c.$$

In addition, received SNRs of the signals at the primary receiver 404 and the secondary receiver 408 can be respectively represented as $p^2\tilde{P}_p/N_p$ and $c^2\tilde{P}_c/N_s$, where p is the quality of signal 410, c is the quality of signal 412, $N_p$ is the noise variance of signal 410, and $N_c$ is the noise variance of signal 412. Moreover, the interference 414 received at the primary receiver can be denoted $f^2\tilde{P}_c/N_p$, where f is the quality of interference 414, and the interference 416 at the secondary receiver 408 can be denoted as $g^2\tilde{P}_p/N_s$, where g is the quality of interference 416.

In this regard, the linear superposition coding strategy for the cognitive radio 406, which refers to the ability to use a portion of transmission power for relaying an uplink transmission from the primary radio 402 and another portion to transmit a peer-to-peer signal, as described, can be represented as vector:

$$X_c^n = \hat{X}_c^n + \sqrt{\alpha \frac{P_c}{P_p}} X_p^n,$$

where $\hat{X}_c{}^n$ is the signal vector containing the message for the cognitive receiver and a is a tunable constant. The Gaussian noise at the secondary receiver 408 has power $N_s/|c|^2$. Additionally, the discrete-time base-band signal received at the primary receiver 404 at time sample m can be expressed as:

$$Y_p[m] = pX_p[m] + f\sqrt{\alpha \frac{P_c}{P_p}} X_p[m - l_c] + Z_{total}[m],$$

where $Z_{total}[m] = f\hat{X}[m-l_c] + Z_p[m]$ is the aggregate noise and $l_c$ accounts for delay incurred while the cognitive radio 406 listens and decodes the codeword from the primary radio 402 before transmitting its own signal. This equation essentially describes a time-invariant two-tap intersymbol interference (ISI) channel for the primary transmission signal 410, hence a Rake receiver can be utilized (in the case the primary system uses direct-sequence spread-spectrum) or transmit-receive architectures such as OFDM to extract both a diversity gain of two and a power gain of $|p|^2\tilde{P}_p + |f|^2\alpha P_c$ at the primary receiver 404. Given $\alpha \in [0,1]$, the rates achievable by the primary radio 402 and cognitive radio 406 using such a scheme can be given by:

$$0 \leq R_p \leq \log\left(1 + \frac{|p|^2 P_p + |f|^2 \alpha P_c}{N_p + |f|^2(1-\alpha)P_c}\right),$$

$$0 \leq R_c \leq \log\left(1 + \frac{|c|^2(1-\alpha)P_c}{N_s}\right).$$

To avoid causing interference to the primary receiver 404, the following equation, thus, should be satisfied:

$$\frac{|p|^2 P_p + |f|^2 \alpha P_c}{N_p + |f|^2(1-\alpha)P_c} = \frac{|p|^2 P_p}{N_p}.$$

If the cognitive radio 406 tunes parameter a such that $$\alpha = \frac{|p|^2 P_p / N_p}{1 + |p|^2 P_p / N_p},$$

this condition will be satisfied, hence $R_p = R^*_p$. The formula above confirms that if the primary system is operating at high SNR, the cognitive radio 406 should not interfere with it (e.g., $\alpha$ should be close to one).

According to the above formulas, to design the optimal $\alpha$, the cognitive radio 406 needs to know the received SNR of the primary transmission at the primary receiver 404: $|p|^2 P_p / N_p$. If the primary system uses a capacity achieving additive white Gaussian noise (AWGN) channel code and the cognitive radio 406 knows this (e.g., through configuration, specification, etc.), the cognitive radio 406 can compute an estimate of this received SNR since it knows the rate at which the primary user is communicating, $R_p$. This estimate can simply be given by $e^{R_p} - 1$. Thus, an immediate benefit of the described is that the primary receiver 404 need not feed-back the parameters f and p; rather the cognitive radio can perform completely autonomously, in one example.

Where the cognitive radio 406 does not have information about |f| and perhaps cannot obtain $|p|^2 P_p / N_p$, the cognitive radio 406 can enter the spectrum of the primary by slowly ramping up its power $P_c$ from 0 and decreasing $\alpha$ from 1 while simultaneously listening for an ARQ control signal from the primary receiver 404. Once this signal is detected, the cognitive radio 406 can either slightly decrease $P_c$ or increase $\alpha$ until the primary receiver 404 stops transmitting ARQ, in one example.

Figure 5:
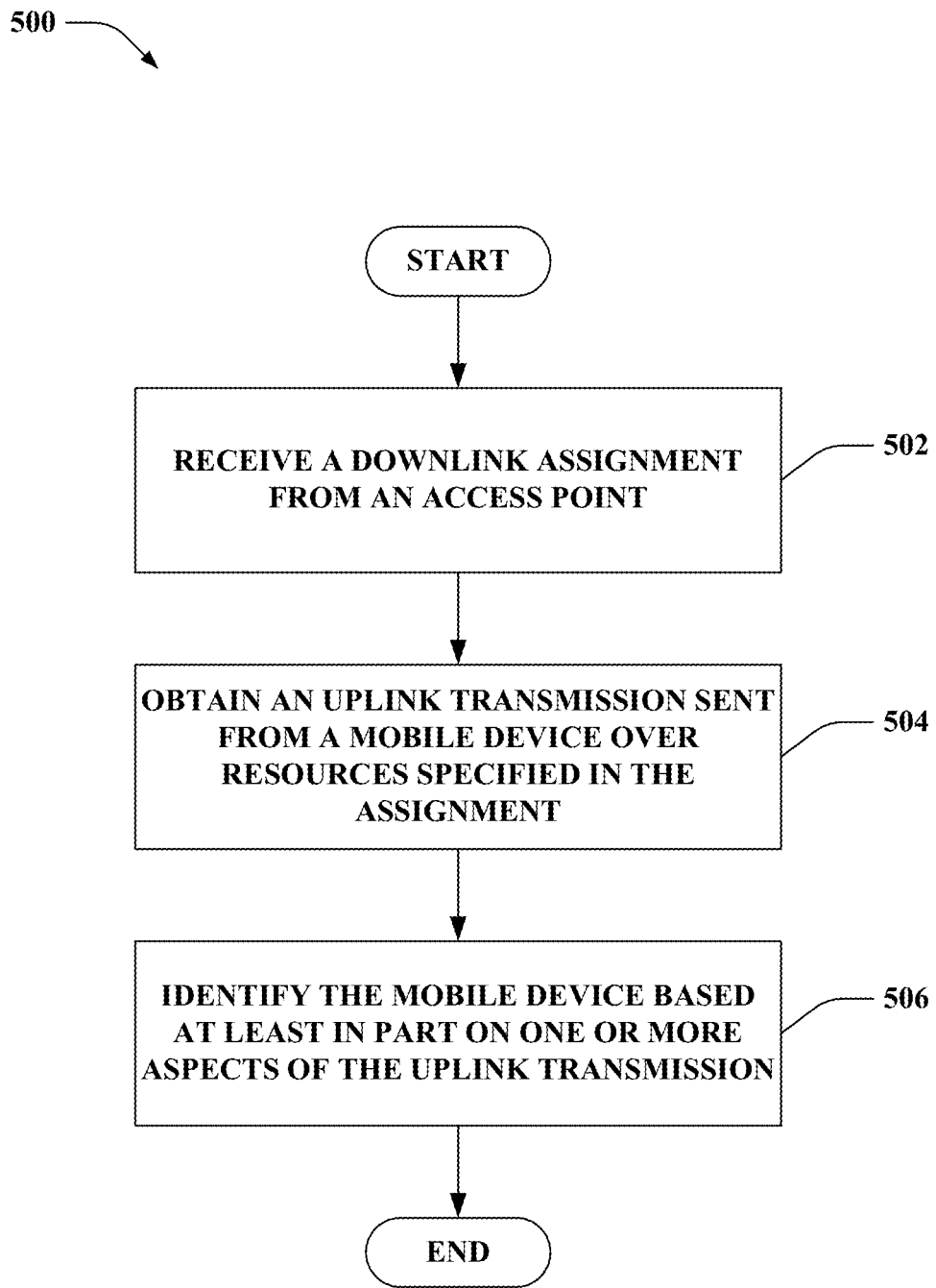
FIG. 5 is an illustration of an example methodology that identifies neighboring devices in a wireless network.
Figure 6:
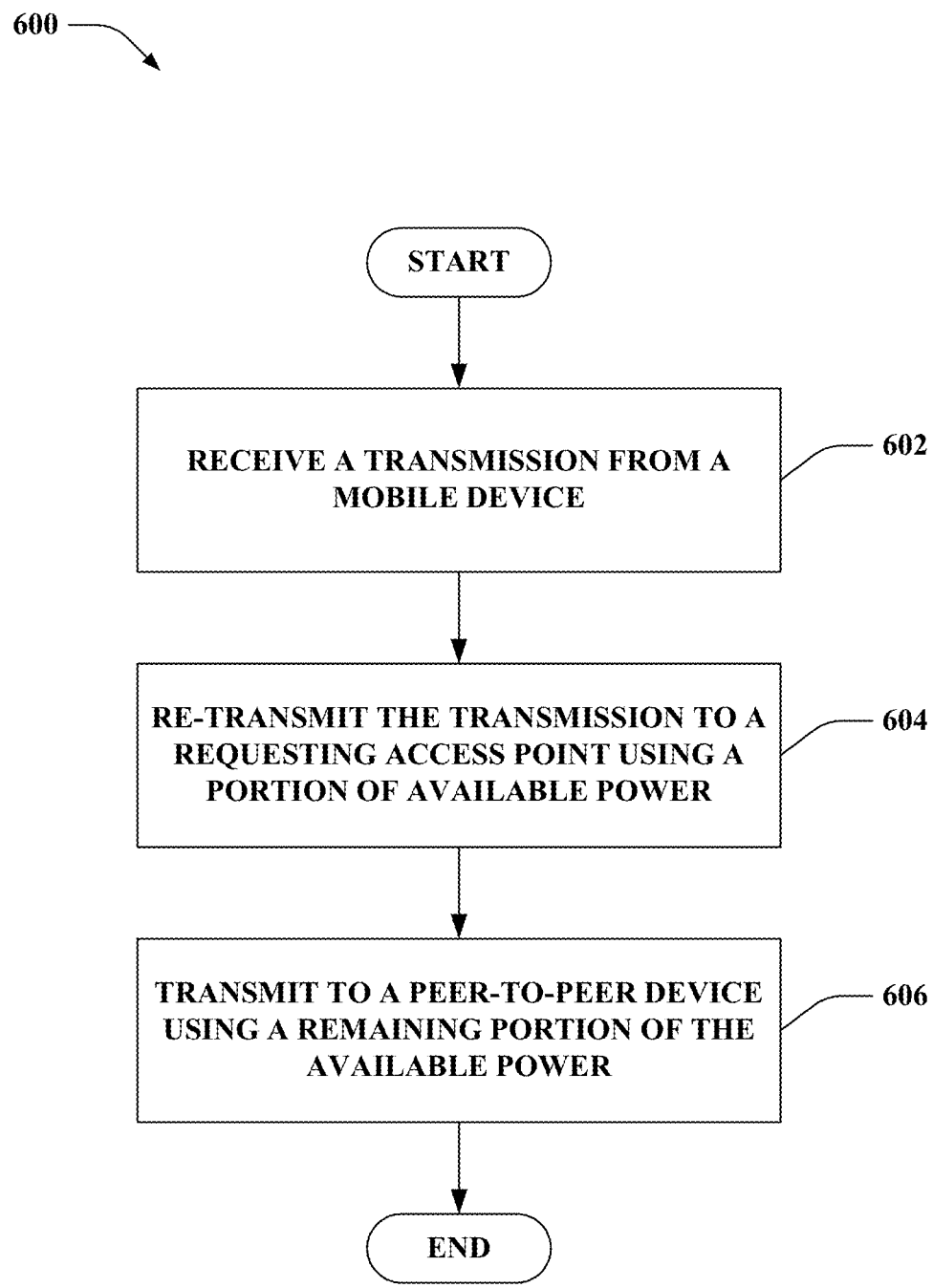
FIG. 6 is an illustration of an example methodology that provides cognitive peer-to-peer communication in a wireless network.

Referring to FIGS. 5-6, methodologies relating to identifying wireless network devices and performing cognitive peer-to-peer communications therewith are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 5, an example methodology 500 that facilitates identifying neighboring devices in a wireless communications system is illustrated. At 502, a downlink assignment can be received from an access point. As described, the assignment can be obtained over the air in a transmission to a related mobile device. The downlink assignment can comprise a set of resources that the mobile device can utilize to communicate with the access point. At 504, an uplink transmission sent from a mobile device over resources specified in the assignment can be obtained; this can be a signal in a wireless network configuration. At 506, the mobile device can be identified based at least in part on one or more aspects of the uplink transmission. Thus, for example, the signal can be decoded and an identifier included in the transmission can be determined. In another example, other aspects, such as a hopping or scrambling pattern of the signal, can be utilized to identify the mobile device, as described.

Referring to FIG. 6, an example methodology 600 is shown that facilitates cognitive peer-to-peer communication in an occupied frequency spectrum. At 602, a transmission can be received from a mobile device. For example, the transmission can be obtained from resources granted to the mobile device by a related access point. In addition, the mobile device can communicate with the access point using a re-transmission technology, such as H-ARQ, so that transmissions not properly received at the access point can be re-transmitted. At 604, the transmission received from the mobile device can be re-transmitted to a requesting access point using a portion of available power. The re-transmission can occur simultaneously with re-transmission from the mobile device, as described, boosting the signal from the mobile device. In this regard, a non-acknowledgement indicator can have been received from the access point. At 606, a peer-to-peer device can be transmitted to using a remaining portion of the available power. Thus, the mobile device/access point communication is interfered; however, the interference is mitigated by relaying transmissions from the mobile device. In one example, as described, the peer-to-peer device can be the mobile device.

It will be appreciated that, in accordance with one or more aspects described herein, inferences can be made regarding correlating uplink transmissions to wireless devices, determining power to utilize in re-transmitting and/or peer-to-peer communicating, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
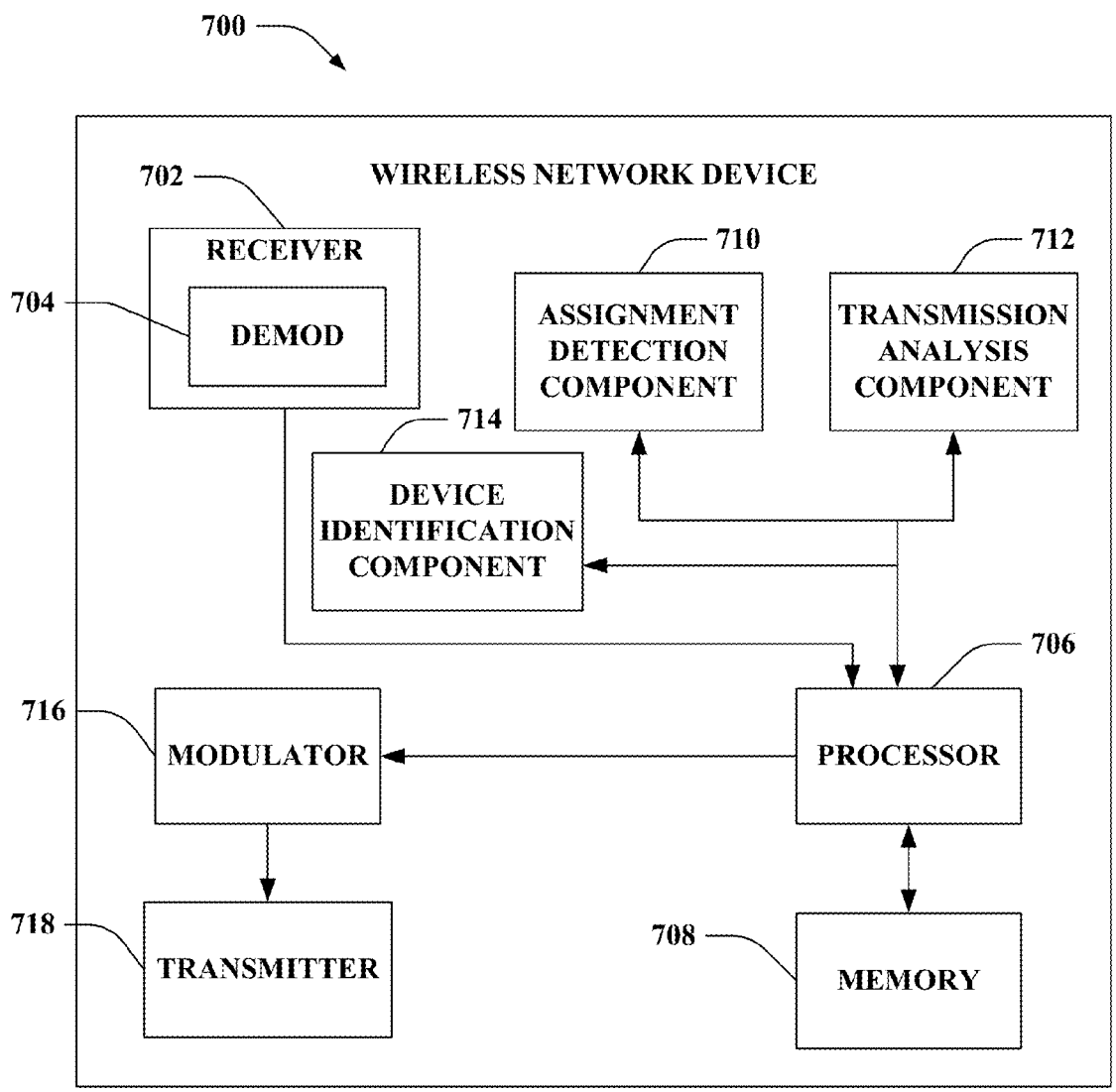
FIG. 7 is an illustration of an example wireless network device that identifies neighboring wireless network devices.

FIG. 7 is an illustration of a wireless network device 700 that facilitates identifying other devices in a wireless network. Wireless network device 700 can be a cognitive radio, mobile device, stationary communication device, access points, and/or substantially any device that communicates over a wireless frequency spectrum. Wireless network device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or more components of wireless network device 700, and/or a processor that both analyzes information received by receiver 702, generates information for transmission by transmitter 718, and controls one or more components of wireless network device 700.

Wireless network device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to an assignment detection component 710 that can receive a resource assignment intended for a disparate wireless network device (not shown), a transmission analysis component 712 that can evaluate messages transmitted over the resources to an access point to determine the corresponding disparate wireless network device, and a device identification component 714 that can identify the disparate wireless network device based at least in part on one or more aspects of the transmission over the resources, as described. In addition, the wireless network device 700 can peer-to-peer communicate with the disparate wireless network device or another peer-to-peer device (not shown) using a portion of power available at the transmitter 718. Concurrently, the transmitter 718 can re-transmit the evaluated message, where re-transmission is desired by the access point, in conjunction with the disparate wireless network device to act as a relay, as described. Although depicted as being separate from the processor 706, it is to be appreciated that the demodulator 704, assignment detection component 710, transmission analysis component 712, device identification component 714, and/or modulator 716 can be part of the processor 706 or multiple processors (not shown).

Figure 8:
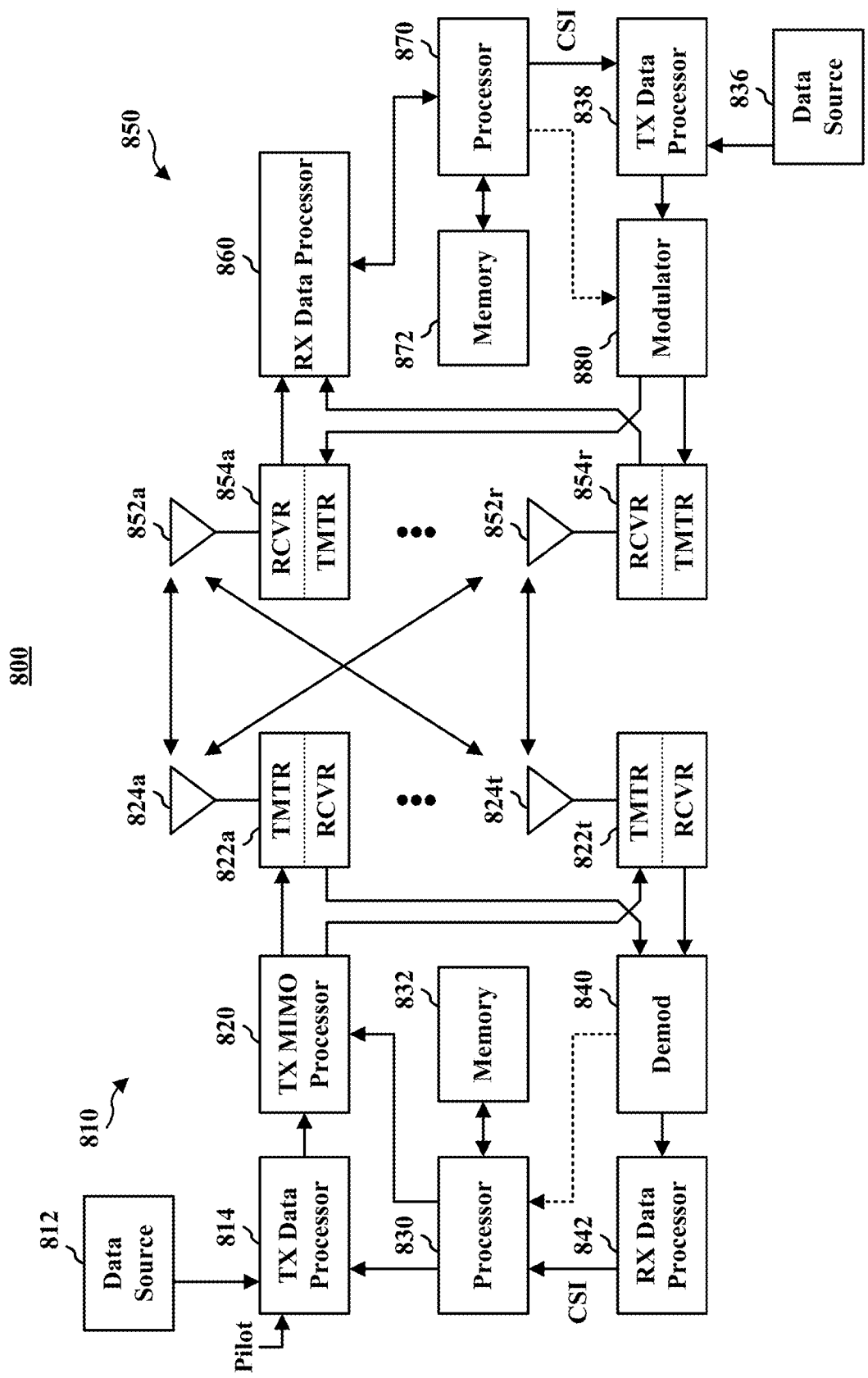
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-4 and 7) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various aspects, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
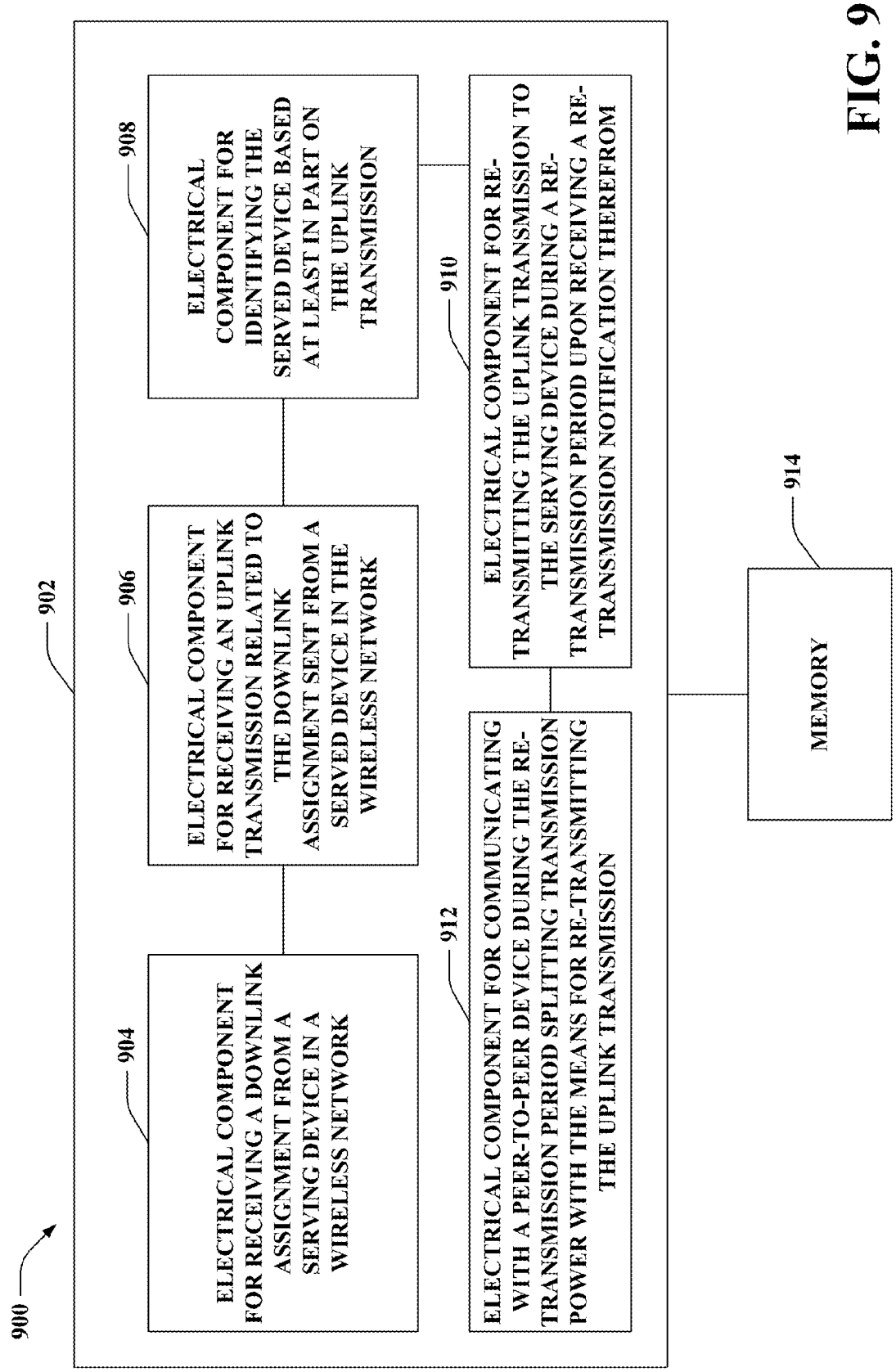
FIG. 9 is an illustration of an example system that identifies devices in a wireless network based on transmissions therefrom.

With reference to FIG. 9, illustrated is a system 900 that facilitates identifying devices in a wireless network and cognitively communicating therewith over a utilized portion of the frequency spectrum. For example, system 900 can reside at least partially within a base station, mobile device, cognitive radio, stationary device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a downlink assignment from a serving device in a wireless network 904. For example, the serving device can transmit the assignment to a served device to facilitate communicating therewith over a frequency spectrum of the wireless network. In addition, logical grouping 902 can include an electrical component for receiving an uplink transmission related to the downlink assignment sent from a served device in the wireless network 906. The transmission can be sent over the assigned resources, in one example.

Moreover, logical grouping 902 can include an electrical component for identifying the served device based at least in part on the uplink transmission 908. As described, the device can be identified by an identifier in the transmission, a hopping or scrambling pattern utilized for the transmission, and/or one or more additional or alternative aspects of the transmission. Furthermore, logical grouping 902 can include an electrical component for re-transmitting the uplink transmission to the serving device during a re-transmission period upon receiving a re-transmission notification therefrom 910. As described, the re-transmission notification can be received by listening on a control channel between the serving and served devices. Also, logical grouping 902 can further include an electrical component 912 for communicating with a peer-to-peer device during the re-transmission period splitting transmission power with the electrical component 910. Thus, though peer-to-peer communication can interfere with serving/served device communication, the system 900 mitigates the interference by additionally relaying re-transmissions from the served device. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
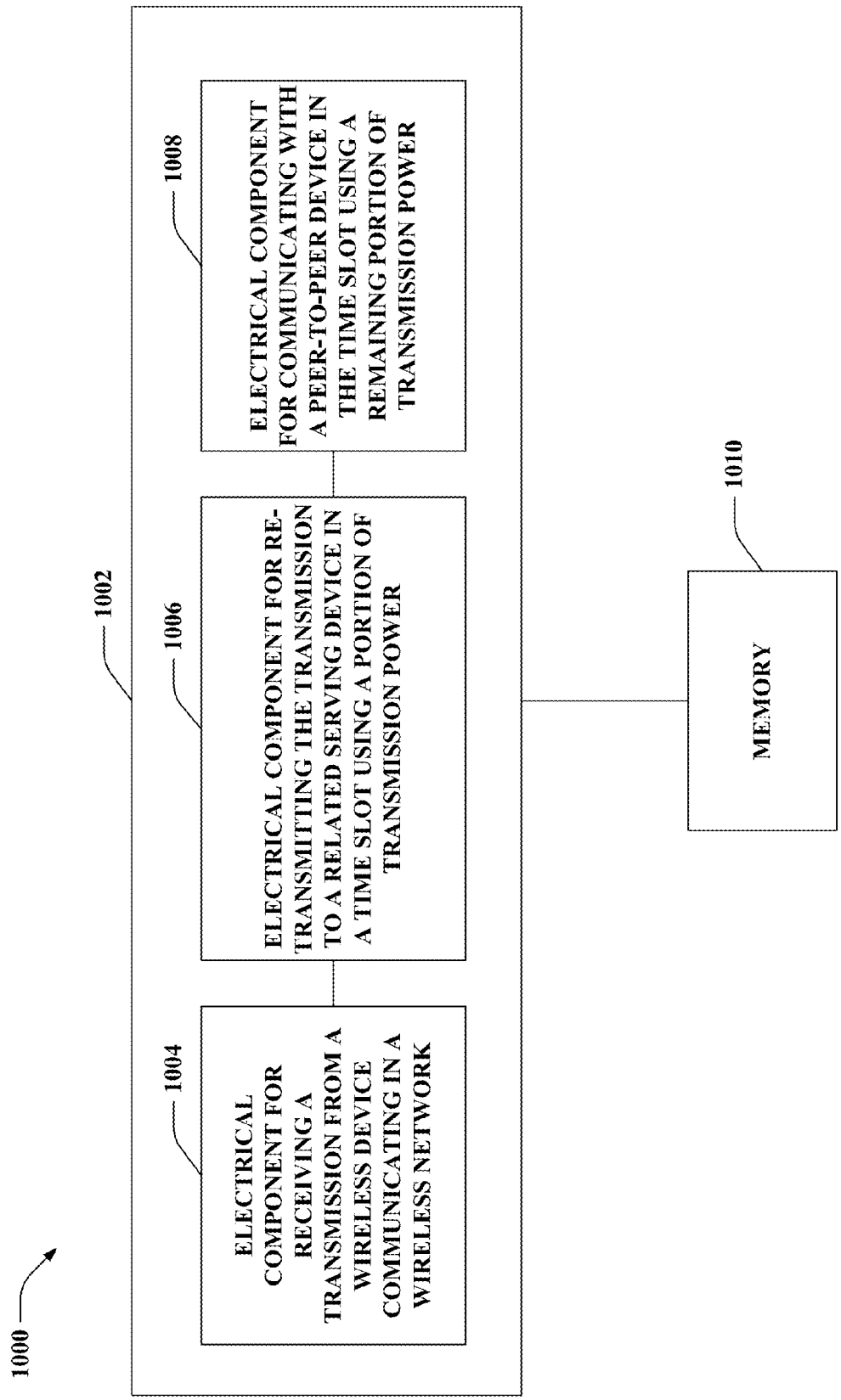
FIG. 10 is an illustration of an example system that communicates with devices over utilized portions of a frequency spectrum.

With reference to FIG. 10, illustrated is a system 1000 that cognitively communicates with devices in a wireless network over utilized resources. For example, system 1000 can reside at least partially within a base station, mobile device, cognitive radio, stationary device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a transmission from a wireless device communicating in a wireless network 1004. Furthermore, logical grouping 1002 can include an electrical component for re-transmitting the transmission to a related serving device in a time slot using a portion of transmission power 1006.

Moreover, logical grouping 1002 can include an electrical component for communicating with a peer-to-peer device in the time slot using a remaining portion of transmission power 1008. Thus, as described, peer-to-peer communication can occur while re-transmitting signals from a wireless device to mitigate interference from the peer-to-peer communication. In one example, the peer-to-peer device and the wireless device can be the same device. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
    transmitting, at a mobile device, an uplink transmission to a serving device in a wireless network;
    re-transmitting, at the mobile device, the uplink transmission to the serving device during an uplink re-transmission time slot, wherein the uplink transmission is a primary communication over a frequency spectrum reserved for a given technology; and
    receiving, at the mobile device, a cognitive peer-to-peer communication from a cognitive peer-to-peer device during the uplink re-transmission time slot, wherein the cognitive peer-to-peer communication is a secondary communication over the frequency spectrum reserved for the given technology.

2. The method of claim 1, further comprising receiving a re-transmission notification from the serving device for the uplink transmission.

3. The method of claim 2, wherein the re-transmission notification is received over a control channel.

4. The method of claim 1, wherein:
    the re-transmission of the uplink transmission to the serving device is simultaneous with a re-transmission of the uplink transmission by the cognitive peer-to-peer device;
    the re-transmission of the uplink transmission by the cognitive peer-to-peer device uses a portion of available transmission power; and
    the cognitive peer-to-peer communication uses a remaining portion of the available transmission power.

5. The method of claim 1, wherein the serving device is an access point and the cognitive peer-to-peer device is a cognitive radio.

6. A wireless communications apparatus, comprising:
    at least one processor configured to:
    transmit an uplink transmission to a serving device in a wireless network;
    re-transmit the uplink transmission to the serving device during an uplink re-transmission time slot, wherein the uplink transmission is a primary communication over a frequency spectrum reserved for a given technology; and
    receive a cognitive peer-to-peer communication from a cognitive peer-to-peer device during the uplink re-transmission time slot, wherein the cognitive peer-to-peer communication is a secondary communication over the frequency spectrum reserved for the given technology; and
    a memory coupled to the at least one processor.

7. The wireless communications apparatus of claim 6, wherein the at least one processor is further configured to receive a re-transmission notification from the serving device for the uplink transmission.

8. The wireless communications apparatus of claim 7, wherein the re-transmission notification is received over a control channel.

9. The wireless communications apparatus of claim 6, wherein:
    the re-transmission of the uplink transmission to the serving device is simultaneous with a re-transmission of the uplink transmission by the cognitive peer-to-peer device;
    the re-transmission of the uplink transmission by the cognitive peer-to-peer device uses a portion of available transmission power; and
    the cognitive peer-to-peer communication uses a remaining portion of the available transmission power.

10. The wireless communications apparatus of claim 6, wherein the serving device is an access point and the cognitive peer-to-peer device is a cognitive radio.

11. An apparatus, comprising:
    means for transmitting an uplink transmission to a serving device in a wireless network;
    means for re-transmitting the uplink transmission to the serving device during an uplink re-transmission time slot, wherein the uplink transmission is a primary communication over a frequency spectrum reserved for a given technology; and
    means for receiving a cognitive peer-to-peer communication from a cognitive peer-to-peer device during the uplink re-transmission time slot, wherein the cognitive peer-to-peer communication is a secondary communication over the frequency spectrum reserved for the given technology.

12. The apparatus of claim 11, further comprising means for receiving a re-transmission notification from the serving device for the uplink transmission.

13. The apparatus of claim 12, wherein the re-transmission notification is received over a control channel.

14. The apparatus of claim 11, wherein:
    the re-transmission of the uplink transmission to the serving device is simultaneous with a re-transmission of the uplink transmission by the cognitive peer-to-peer device;
    the re-transmission of the uplink transmission by the cognitive peer-to-peer device uses a portion of available transmission power; and the cognitive peer-to-peer communication uses a remaining portion of the available transmission power.

15. The apparatus of claim 11, wherein the serving device is an access point and the cognitive peer-to-peer device is a cognitive radio.

16. A non-transitory computer-readable medium embodied with computer-executable code, comprising:
   code for causing at least one computer to transmit an uplink transmission to a serving device in a wireless network;
   code for causing the at least one computer to re-transmit the uplink transmission to the serving device during an uplink re-transmission time slot, wherein the uplink transmission is a primary communication over a frequency spectrum reserved for a given technology; and
   code for causing the at least one computer to receive a cognitive peer-to-peer communication from a cognitive peer-to-peer device during the uplink re-transmission time slot, wherein the cognitive peer-to-peer communication is a secondary communication over the frequency spectrum reserved for the given technology.

17. The non-transitory computer-readable medium of claim 16, further comprising code for causing the at least one computer to receive a re-transmission notification from the serving device for the uplink transmission.

18. The non-transitory computer-readable medium of claim 17, wherein the re-transmission notification is received over a control channel.

19. The non-transitory computer-readable medium of claim 16, wherein:
   the re-transmission of the uplink transmission to the serving device is simultaneous with a re-transmission of the uplink transmission by the cognitive peer-to-peer device;
   the re-transmission of the uplink transmission by the cognitive peer-to-peer device uses a portion of available transmission power; and
   the cognitive peer-to-peer communication uses a remaining portion of the available transmission power.

20. The non-transitory computer-readable medium of claim 16, wherein the serving device is an access point and the cognitive peer-to-peer device is a cognitive radio.

21. An apparatus, comprising:
   a transmitter configured to transmit an uplink transmission to a serving device in a wireless network and re-transmit the uplink transmission to the serving device during an uplink re-transmission time slot, wherein the uplink transmission is a primary communication over a frequency spectrum reserved for a given technology; and
   a receiver configured to receive a cognitive peer-to-peer communication from a cognitive peer-to-peer device during the uplink re-transmission time slot, wherein the cognitive peer-to-peer communication is a secondary communication over the frequency spectrum reserved for the given technology.

22. The apparatus of claim 21, wherein the receiver is further configured to receive a re-transmission notification from the serving device for the uplink transmission.

23. The apparatus of claim 22, wherein the re-transmission notification is received over a control channel.

24. The apparatus of claim 21, wherein:
   the re-transmission of the uplink transmission to the serving device is simultaneous with a re-transmission of the uplink transmission by the cognitive peer-to-peer device;
   the re-transmission of the uplink transmission by the cognitive peer-to-peer device uses a portion of available transmission power; and
   the cognitive peer-to-peer communication uses a remaining portion of the available transmission power.

25. The apparatus of claim 21, wherein the serving device is an access point and the cognitive peer-to-peer device is a cognitive radio.

26. A method, comprising:
   transmitting an uplink transmission to a serving device during an uplink transmission time slot using a portion of available transmission power, wherein the uplink transmission is a primary communication over a cellular frequency spectrum; and
   transmitting, based on a detection of a downlink resource assignment associated with the primary communication, a peer-to-peer communication to a peer-to-peer device during the uplink transmission time slot using a remaining portion of available transmission power while transmitting the uplink transmission to the serving device, wherein the peer-to-peer communication is a secondary communication over the cellular frequency spectrum.

27. The method of claim 26, wherein the serving device is an access point.

28. The method of claim 26, further comprising computing an estimate of a signal-to-noise ratio (SNR) of the uplink transmission.

29. The method of claim 26, further comprising utilizing a linear superposition coding strategy to transmit the uplink transmission using the portion of the available transmission power and to transmit the peer-to-peer communication using the remaining portion of the available transmission power.

30. The method of claim 29, wherein the uplink transmission is transmitted over a time-invariant two-tap intersymbol interference (ISI) channel.

31. A wireless communications apparatus, comprising:
   at least one processor configured to:
      transmit an uplink transmission to a serving device during an uplink transmission time slot using a portion of available transmission power, wherein the uplink transmission is a primary communication over a frequency spectrum reserved for a given technology; and
      transmit, based on a detection of a downlink resource assignment associated with the primary communication, a peer-to-peer communication to a peer-to-peer device during the uplink transmission time slot using a remaining portion of available transmission power while transmitting the uplink transmission to the serving device, wherein the peer-to-peer communication is a secondary communication over the frequency spectrum reserved for the given technology; and
   a memory coupled to the at least one processor.

32. The wireless communications apparatus of claim 31, wherein the serving device is an access point.

33. The wireless communications apparatus of claim 31, wherein the at least one processor is further configured to compute an estimate of a signal-to-noise ratio (SNR) of the uplink transmission.

34. An apparatus, comprising:
   means for transmitting an uplink transmission to a serving device during an uplink transmission time slot using a portion of available transmission power, wherein the uplink transmission is a primary communication over a frequency spectrum reserved for a given technology; and means for transmitting, based on a detection of a downlink resource assignment associated with the primary communication, a peer-to-peer communication to a peer-to-peer device during the uplink transmission time slot using a remaining portion of available transmission power while transmitting the uplink transmission to the serving device, wherein the peer-to-peer communication is a secondary communication over the frequency spectrum reserved for the given technology.

35. The apparatus of claim 34, wherein the serving device is an access point.

36. The apparatus of claim 34, further comprising means for computing an estimate of a signal-to-noise ratio (SNR) of the uplink transmission.

37. A non-transitory computer-readable medium embodied with computer-executable code, comprising:
   code for causing at least one computer to transmit an uplink transmission to a serving device during an uplink transmission time slot using a portion of available transmission power, wherein the uplink transmission is a primary communication over a frequency spectrum reserved for a given technology; and
   code for causing the at least one computer to transmit, based on a detection of a downlink resource assignment associated with the primary communication, a peer-to-peer communication to a peer-to-peer device during the uplink transmission time slot using a remaining portion of available transmission power while transmitting the uplink transmission to the service device, wherein the peer-to-peer communication is a secondary communication over the frequency spectrum reserved for a given technology.

38. The non-transitory computer-readable medium of claim 37, wherein the serving device is an access point.

39. The non-transitory computer-readable medium of claim 37, further comprising code for causing the at least one computer to compute an estimate of a signal-to-noise ratio (SNR) of the uplink transmission.

40. An apparatus, comprising:
   a processor; and
   a transmitter configured to:
   transmit an uplink transmission to a serving device during an uplink transmission time slot using a portion of available transmission power, wherein the uplink transmission is a primary communication over a frequency spectrum reserved for a given technology; and
   transmit, based on a detection of a downlink resource assignment associated with the primary communication, a peer-to-peer communication to a peer-to-peer device during the uplink transmission time slot using a remaining portion of available transmission power while transmitting the uplink transmission to the serving device, wherein the peer-to-peer communication is a secondary communication over the frequency spectrum reserved for the given technology.

41. The apparatus of claim 40, wherein the serving device is an access point.

42. The apparatus of claim 40, wherein the processor is configured to compute an estimate of a signal-to-noise ratio (SNR) of the uplink transmission.

43. The method of claim 26, wherein the serving device comprises a base station.

* * * * *